(12) United States Patent
Gupta et al.

(10) Patent No.: US 7,076,531 B2
(45) Date of Patent: Jul. 11, 2006

(54) BROADBAND SIGN-OFF

(75) Inventors: Vinay Gupta, Redmond, WA (US);
John Strauch, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 801 days.

(21) Appl. No.: 09/797,476

(22) Filed: Feb. 28, 2001

(65) Prior Publication Data

US 2002/0120713 A1    Aug. 29, 2002

(51) Int. Cl.
*G06F 15/16* (2006.01)
(52) U.S. Cl. ..................................... 709/217
(58) Field of Classification Search ................ 709/203, 709/217; 705/30, 35, 39, 404
See application file for complete search history.

(56) References Cited

U.S. PATENT DOCUMENTS

| 5,884,284 | A | * | 3/1999 | Peters et al. .................. 705/30 |
| 5,920,846 | A | * | 7/1999 | Storch et al. .................. 705/7 |
| 6,029,141 | A | * | 2/2000 | Bezos et al. .................. 705/27 |
| 6,173,326 | B1 | * | 1/2001 | Collins ....................... 709/229 |
| 6,484,147 | B1 | * | 11/2002 | Brizendine et al. ........... 705/14 |
| 6,532,543 | B1 | * | 3/2003 | Smith et al. ................. 713/201 |

OTHER PUBLICATIONS

"Covad and Yahoo! Sign Broadband Marketing Agreement", Nov. 1999, from: http://docs.yahoo.com/docs/pr/released410.html.
Luening & Hu, "Yahoo inks broadband deals with Covad, NorthPoint", Nov. 1999, from: http://technews.netscape.com/news/0-1005-200-1429478.html.
"Microsoft's TV Platform Makes Broadband Services a Reality for Cable Industry", Jun. 1999, from: http://www.microsoft.com/TV/Press/news/ne_broadband_01.asp.
"RadioShack and Microsoft Redefine the Consumer Experience of Getting Online", Sep. 2000, from: http://www.microsoft.com/PressPass/press/2000/Sept00/RadioShackPR.asp.
"Microsoft's TV Platform Makes Broadband Services a Reality for Cable Industry", Jun. 1999, from: http://www.microsoft.com/PressPass/features/1999/06-14ncta.asp.
"Microsoft and RadioShack Form Strategic Alliance to Deliver the Everyday Web to Millions of U.S. Consumers", Nov. 1999, from: http://www.microsoft.com/PressPass/pres/1999/Nov99/RadioShackPR.asp.
Reed Mark, "Jump on the Broadband bandwagon for high-speed Internet Access", Jan. 2000, from: http://www.microsoft.com/Windows98/usingwindows/internet/Articles/001Jan/Broadband.asp.

* cited by examiner

*Primary Examiner*—David Y. Eng
(74) *Attorney, Agent, or Firm*—Klarquist Sparkman, LLP

(57) ABSTRACT

A web based sign-off process that allows a customer and an installation technician to electronically sign-off on a broadband installation for the purpose of recording that service is operating correctly thereby enabling the service providers to start billing for the broadband service. The sign-off takes place once the broadband installation is complete by navigating to a web site containing a sign-off form. Once the form is filled out by the customer and the technician, it is returned over a network to a service provider. The service provider modifies the customer's billing entry so that billing can commence at a broadband access rate.

19 Claims, 11 Drawing Sheets

Fig. 1

GET HIGH-SPEED INTERNET SERVICES!

DSL (DIGITAL SUBSCRIBER LINE) ALLOWS YOU TO TAKE ADVANTAGE OF THE FULL POTENTIAL OF THE WEB WITH SPEEDS UP TO 275 TIMES FASTER THAN 28.8 KBPS MODEMS.

WHO CAN GET DSL?
DSL INTERNET ACCESS IS AVAILABLE IN CERTAIN AREAS. WE EXPECT TO OFFER DSL IN OTHER CITIES SOON.

HOW MUCH DOES DSL COST?
$49.95 PER MONTH FEE, PLUS A $99.95 ONE-TIME SET UP FEE.

HOW DO I GET THIS SPECIAL OFFER?
1. GO THROUGH THE PREQUALIFICATION AND SIGN UP PROCESS.
2. A DSL TECHNICIAN WILL CALL YOU TO SET UP AN APPOINTMENT TO INSTALL THE DSL LINE.
3. A DSL TECHNICIAN WILL THEN COME TO YOUR LOCATION WITHIN 4-6 WEEKS TO TEST THE PHONE LINE AND INSTALL THE DSL CONNECTION.

ADVANTAGES OF DSL
DSL IS UP TO 275 TIMES FASTER THAN 28.8 KBPS MODEM CONNECTIONS!
DSL IS ALWAYS CONNECTED, SO THERE'S NO TIME WASTED ON DIALING A SERVICE PROVIDER, BUSY SIGNALS, WAITING TO BE CONNECTED, OR UNPLANNED DISCONNECTS.
UNLIKE CABLE TELEPHONE AND MODEM SERVICES, WHICH SHARE A LINE WITH OTHERS, DSL PROVIDES A PRIVATE, SECURE, AND UNHINDERED CHANNEL OF COMMUNICATION OVER YOUR OWN LINE.

CLICK "OK" TO CHECK ELIGIBILITY IN YOUR AREA!!

OK

100

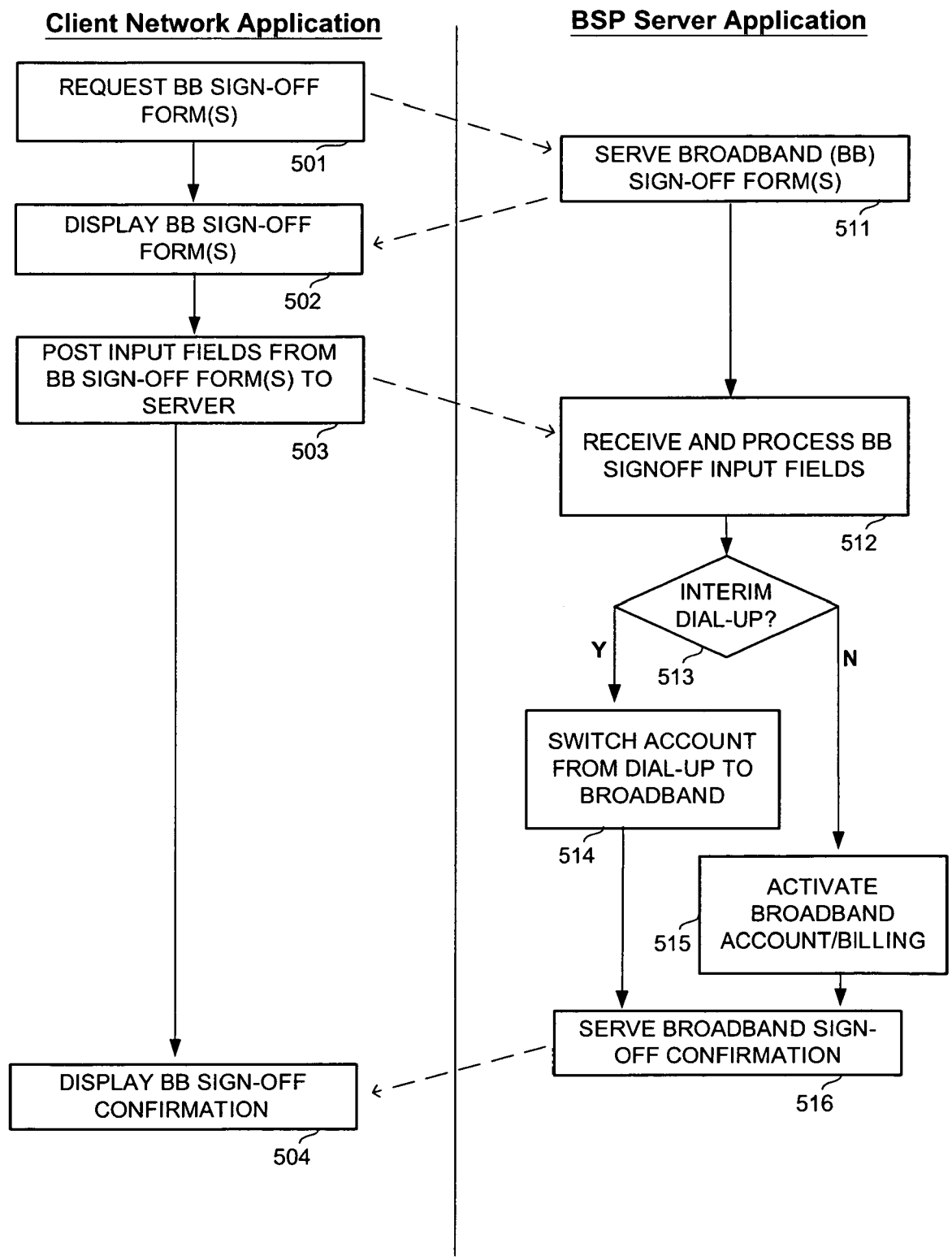

PREQUALIFICATION

FIRST, FIND OUT IF YOU ARE ELIGIBLE FOR DSL SERVICE BASED ON YOUR ADDRESS. YOU WILL NOT BE CHARGED FOR THIS ELIGIBILITY CHECK. YOU WILL ALSO NEED TO CHECK THE MINIMUM SYSTEM REQUIREMENTS.
PLEASE ENTER THE ADDRESS INFORMATION BELOW FOR THE LOCATION WHERE THE DSL SERVICE WILL BE INSTALLED AND CLICK SUBMIT.

FIRST NAME: ⟶ 601
LAST NAME: ⟶ 602
SERVICE ADDRESS: ⟶ 603
CITY STATE ZIP: ⟶ 604
SERVICE PHONE NUMBER: ⟶ 605

Submit ⟶ 606

Fig. 8

BROADBAND IS AVAILABLE FOR:

SUSAN KRITTEN
3225 S WALTON STREET
ANYWHERE, USA 56007
555-555-5555

PLEASE COMPLETE THE FOLLOWING ADDITIONAL INFORMATION TO ORDER YOUR BROADBAND INTERENT ACCESS.

CREDIT CARD TYPE: ⟶ 801

CREDIT CARD NUMBER: ⟶ 802

CREDIT CARD EXPIRATION DATE: ⟶ 803

ADDITIONAL INSTALLATION CONTACT: ⟶ 804

ACCOUNT PASSWORD*: ⟶ 805
*PASSWORD MUST BE AT LEAST SEVEN CHARACTERS.

SUBMIT ⟶ 806

Fig. 9

BROADBAND SIGNOFF PAGE

*THE FACT THAT THIS PAGE IS ABLE TO BE DISPLAYED ON YOUR COMPUTER(S) AND/OR INTERNET APPLIANCE(S), IS PROOF THAT THE TECHNICIAN HAS COMPLETED THE INSTALLATION PROPERLY.*

TECHNICIAN'S CERTIFICATION

I HAVE COMPLETED THE BROADBAND INSTALLATION AT THE BELOW DESCRIBED ADDRESS:

INSTALLATION ADDRESS: _____ 901

NUMBER OF COMPUTER _____ 902

TECHNICIAN NAME: _____ 903

TECHNICIAN CERTIFICATION NUMBER: _____ 904

CONSUMER'S CERTIFICATION

I HAVE VIEWED THIS BROADBAND SIGNOFF PAGE FROM MY COMPUTER(S) AND/OR INTERNET APPLIANCES.

CONSUMER'S NAME: _____ 905

CONSUMER'S MEMBERSHIP NUMBER: _____ 906

CONSUMER'S PASSWORD: _____ 907

DATE: _____ 908

909 — Agree

BROADBAND SIGN-OFF

TECHNICAL FIELD

The present invention relates to an Internet based sign-off by a customer and/or technician on a broadband Internet access installation to verify correct installation and to enable billing.

BACKGROUND AND SUMMARY

Broadband service is high speed data communications service (e.g., high speed Internet access). Broadband can be provided via satellite, digital subscriber line (DSL), wireless, cable, or other transports. Broadband is attractive to consumers, because it provides more rapid access to Internet resources than dial-up service.

Often, because of wiring issues or hardware requirements, it is necessary for a technician to go to a broadband consumer's address to facilitate the broadband Internet access installation. Also, equipment may need to be installed at a phone company office or substation. Sometimes new wires are run to support the new broadband service. It is not unusual for the entire process to take a few months.

Broadband Service Providers (BSP) market broadband services through many conventional marketing means. Broadband is marketed using television, radio, direct mail, brick and mortar retailers and the Internet.

The illustrated embodiment is a web based sign-off process that allows a customer and/or an installation technician to electronically sign-off on a broadband installation for the purpose of recording that the service is operating correctly thereby enabling the service providers to start billing for the broadband service. The sign-off takes place once the broadband installation is completed, by navigating to a web site containing a sign-off form (Broadband Sign-off). Once the form is filled out by the customer and/or the technician, it is sent over the newly installed and/or modified broadband service where it is received by the BSP. The BSP then modifies the customer's account so that billing can commence based upon the new and/or modified broadband access rate. A consumer may be either enrolling in a new broadband access account, or upgrading from dial-up access to broadband access. Further, a consumer may sign-up for temporary or interim dial-up access while they are waiting for the broadband installation.

BRIEF DESCRIPTION OF THE DRAWINGS

FIG. 1 is a graphical windows interface depicting a broadband access offering.

FIG. 5 is a flow chart depicting a broadband signoff transaction between a newly installed broadband service client and a BSP server.

FIG. 6 is a graphical windows interface for pre-qualifying an indicated address or telephone number for broadband network access.

FIG. 8 is a graphical user interface taking a broadband service order for an indicated address.

FIG. 9 is a graphical user interface depicting an illustrated embodiment for broadband sign-off form.

DETAILED DESCRIPTION

Obtaining Consumer Broadband Account Requests

Figure 2:
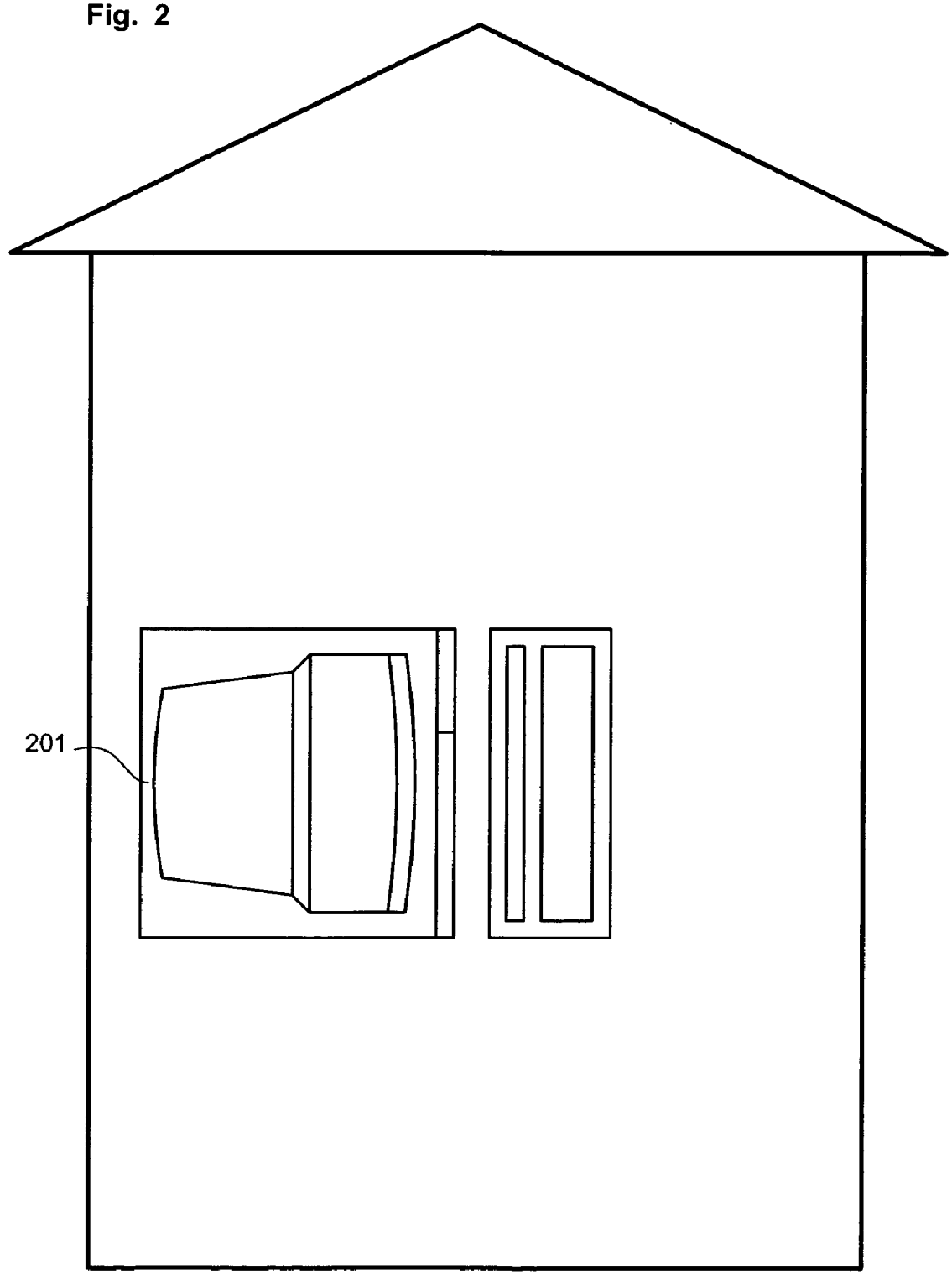
FIG. 2 is a diagram of a computer, Internet appliance, and/or in-store kiosk.

One of the obstacles to getting consumers to order broadband service these days, is getting the service set up within a reasonable time. Public perception of broadband is that it may be installed late or never. Consumers often wait several months before determining that they are not close enough to a substation, a substation does not support broadband, or broadband is not yet implemented in their area. This perception has caused some consumers to wait until the broadband reaches a greater market share. Sluggish broadband market acceptance has troubled content providers who are developing content better suited for broadband access speeds.

However, most consumers are happy with broadband once it is installed. In the illustrated embodiment, Applicants have helped streamline the broadband sign-up process by providing broadband sign-off software and methods that will facilitate the user experience in the broadband enrollment process. Further, the illustrated embodiment helps assure that no consumer is charged at a broadband rate before their service is shown to be functioning properly, and conversely that billing commences once installation is complete.

An embodiment is provided to BSP's who offer broadband services through brick and mortar retailers, through the Internet, and through direct marketing channels. Well known brick and mortar retailers (e.g., Radio Shack, Best Buy and Staples) are particularly appealing since they are well received and trusted by the public in general. A streamlined broadband signup and/or sign-off package marketed by national, regional, and/or local BSP's through brick and mortar retailers takes the pain out of the experience and helps brings these various parties together. Further, it helps create public acceptance of and demand for broadband services (e.g., broadband Internet access).

The multiple associated parties offering and marketing the broadband service by utilizing the illustrated software, installation, and services, can double and triple brand the software, installation, and services to help promote public acceptance. Further, the illustrated signup and/or sign-off methods are readily adaptable so different retailers and service providers can make additions to and adaptations of the illustrated methods in order to meet their specific needs. There are many ways to market goods and services, but a few potential ways to offer broadband services to a consumer are now considered.

Often, a consumer purchases a piece of hardware or software from an equipment vendor. When they open the box and start using the new software and/or hardware, typically they are offered other products and services. What a user experiences when opening the box is called the out of box experience (OOBE). One such OOBE is when a consumer purchases software and/or hardware (e.g., a new personal computer, or an operating system upgrade). When they install the hardware and/or software, they often receive an offer for broadband services. In such a case, an agreement between a BSP, an original equipment (and/or software) manufacturer (OEM), and/or other related parties, results in broadband (Internet and/or data communications) services being offered to the consumer during the OOBE.

For this application, the term broadband service provider(s), (BSP(s)), comprises the following individual entities and/or associations and/or aggregations of the following entities: interim dial-up providers, broadband server software providers, broadband client software providers, broadband Internet service providers, broadband data and/or communications providers, broadband multi-media, video, and/or audio service providers, broadband data services marketers, retailers, and/or wholesalers, dial-up providers offering broadband services, broadband wireless data and/or communications service providers, broadband wireless audio and/or video service providers, broadband access installation providers, and other similarly situated parties. Further, the term "BSP facility" shall comprises any and all facilities and/or buildings constructed for the purpose of housing servers, databases, networks and/or employees utilized to facilitate broadband access offers, broadband account sign-up, broadband account sign-off, broadband account maintenance, and/or broadband account billing, and shall include all servers, databases, and/or networks contained in any such facility and/or building utilized for said purpose.

As shown in FIG. 1, during the OOBE, a screen shot is generated offering broadband access (in this case broadband Internet access) to the consumer. The illustrated screen offering broadband in this case focuses on DSL. However, another embodiment could offer cable, satellite, and/or or other forms of broadband. Further, the illustrated embodiment would offer immediate (interim) dial-up access service, with a transfer to broadband access upon broadband installation. In either case, if the consumer clicks "OK" 100, a series of screen shots are generated to obtain information from the consumer in order to determine the kinds of broadband access available in the consumer's area (see Broadband Pre-qualification below) and/or obtain the information necessary to set up an account with the BSP. The generated series of screen shots are implemented using an Internet browser application and/or other application(s) known in the art to support graphical user interfaces and/or textual interaction with computer users in a network environment.

This generated offer (FIG. 1) is one phase of an exemplary OOBE. This interactive OOBE broadband sign-up, also offers interim dial-up access until such time that the broadband access is installed and/or available. Further, it is not unusual for a consumer to be offered sign-up deals that include credits and/or rebates from a BSP that can be used to purchase other software and/or hardware at an OEM and/or other brick and mortar retailers in return for signing an access contract for a set period of time (e.g., months, years, etc.).

Consumers are also offered a broadband access account while surfing a network (e.g., FIG. 1) or reading an e-mail offer. This type of broadband access account creation over a network is called remote account creation (RAC). Again, since the types of broadband access vary by area, a proposed location for broadband access must be pre-qualified (See FIG. 6).

Consumers are also offered broadband access (FIG. 1) at a kiosk in a brick and mortar retailer store (e.g., Radio Shack, Best Buy, Staples, etc.) A kiosk is a computer, terminal, and/or Internet appliance featuring software or a link to a remote site including a series of electronic screens and/or forms to gather information from the client in order to pre-qualify the consumer's desired broadband access location and to create a broadband access order. Further, the kiosk may itself provide broadband sign-up support by navigating to a RAC Internet page of a BSP offering the broadband access.

The software that enables the pre-qualification, sign-up, and sign-off are licensed to and/or made available to different OEMs and/or BSPs. The illustrated embodiment may also be customized to facilitate offering broadband services by many different OEMs and/or BSPs. These OEMs and/or BSPs can enter into agreements that allow them to brand the illustrated embodiments, packaging or displays, but it is the illustrated embodiment that facilitates the broadband set-up and/or sign-off.

A consumer request for broadband service can be ordered via a number of methods, including, through a kiosk at a retail store, via a web site, or over the phone. During the broadband order process, an account is created for the customer with the BSP. A customer and/or consumer may be an individual and/or business. When a consumer orders broadband services, an order is created with the BSP and/or installation company.

All the potential marketing methods are geared towards producing a consumer interested in obtaining broadband service access. It must then be determined whether or not broadband is available at the consumer's desired location, and (potentially) whether or not the consumer would like dial-up service until the broadband service is installed.

Broadband Pre-Qualification/Ordering

The pre-qualification process takes the address and phone number where broadband service is desired, and determines whether that address qualifies for broadband. If the address qualifies for broadband, then an account is set up, and an order for broadband installation is completed. The type of broadband and the availability of broadband varies based on area, and the pre-qualification process more specifically determines what is available at a given address. For example, in order to be eligible for DSL broadband access, the desired address must be within a given distance from a substation. Whereas, Satellite broadband typically offers broadband downloads and dial-up uploads. Broadband cable may be available in some areas. If an address does not have DSL broadband, maybe cable or satellite is available. Further, if no broadband is available, dial-up may be offered to the consumer.

As shown in FIG. 2, the consumer, a BSP representative, and/or an OEM representative fills out an electronic form during the described telephone call, OOBE, RAC, and/or at the in-store kiosk 201. Based on the address, zip code, and/or telephone number of the desired broadband access location, the system pre-qualifies the available broadband service and/or an available BSP for the proposed broadband service address and/or phone number.

Figure 7:
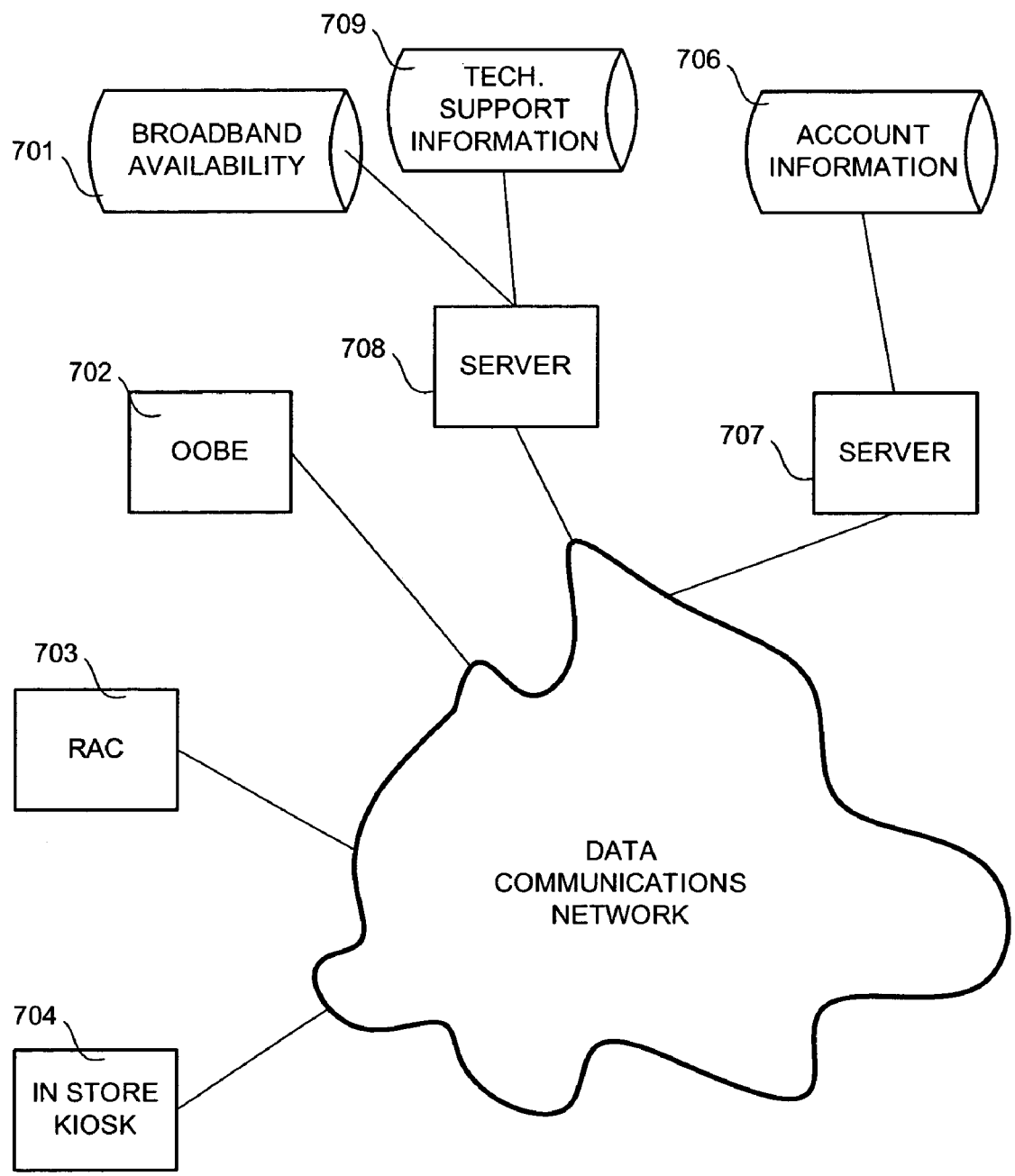
FIG. 7 is a network diagram depicting assorted potential client entities making requests to a broadband service provider.

As shown in FIG. 6, the pre-qualification electronic form requests name, address, and phone number in order to pre-qualify the location where the consumer wants broadband installed. As shown in FIG. 7, this pre-qualifying information is sent from the OOBE 702, the RAC 703, or the kiosk 704, over the Internet (and/or network) to a first BSP server 707. In the illustrated embodiment, the first BSP server determines a potential second BSP server 708 to install and support broadband access at the location where the consumer wants broadband service installed. The second BSP server 708 accesses an availability database 701 to determine whether broadband is available at the requested location. The broadband availability database 701 compares the pre-qualification information with the database, and determines based on the address, phone number, and/or other information, whether or not broadband is available for the specific location (or wireless device). The database indicates what addresses (or areas) are within the DSL range, what addresses (or areas) are marginal, what addresses (or areas) are not within DSL range, and what addresses (or areas) are completely unknown because (for example) the database is incomplete or the information is not yet available. Another embodiment would include other types of broadband availability data such as cable, satellite, wireless and/or other delivery means. The second BSP server 708 then notifies the first BSP server 707, whether or not the second BSP server will install and support broadband service at the requested address (or area). If broadband is available for the given address and/or phone number, the first BSP server 707, then notifies the consumer. The first BSP server offers a set of sign-up forms to the client 702–704.

As shown in FIG. 8, the broadband access enrollment form collects additional information like a member password, account information, and credit card number. Another embodiment features not only account enrollment, but an OEM identification code entry to identify the OEM (the OEM identification code may earn monetary reward for the OEM, or may signal a preferred content provider status for the OEM), a browser application selection, and/or a desktop Internet access icon setup. The forms are adaptable to collect additional information that is desired by the BSP and/or the OEM. For example, a landlord name and phone number, the number of computers, a network card, or other hardware information may be required to determine whether the consumer's existing equipment or location will support the offered broadband. After completing the form (FIG. 8), the consumer "Submits" 806 the broadband order, and technical support information is sent to first BSP server 707 where all the account information is stored in a database 706, and the first BSP server then sends an account request with technical support information to the second BSP server 708, where it is stored in a technical support database 709.

When the consumer clicks "Submit," 806 this causes the browser to "Post" the form to the server 707 using well known HTTP internet protocols (see Elizabeth Castro, *HTML For The World Wide Web*, Peachpit Press, 1996, at page 102). The first BSP server 707 server then executes a new account process that inputs the new order and/or sends a message to other parties 708–709 (e.g., local broadband installation entity, cooperating OEM, broadband access provider and/or etc.). Another embodiment uses a non-Internet browser application and/or a non-HTTP application, and instead uses other graphical user interface applications or textual based interface applications known in the computer arts to collect and transport the information necessary to complete the broadband installation request, order, and/or sign-off over a network. The first BSP server receives the service request and opens a new broadband account in a BSP database 707, 706, and returns an account number to the account broadband account ordering consumer 702–704.

The illustrated embodiment, indicates plural associated businesses offering and supporting broadband services to a consumer. In this embodiment, the first entity generates and maintains the primary relationship with the consumer, and subcontracts with a second entity to provide broadband access and support. In this business configuration, the first entity collects account fees from the consumer, and pays the second entity to install and support the broadband access at the consumers requested location. The second entity may contract with even a third entity to perform the broadband installation at the consumers location (or on the consumers wireless appliance). In this illustrated embodiment, the first entity controls the first BSP server 707, and the second entity controls the second BSP server 708. In another embodiment, one entity could provide and control all described services for the consumer 706–709, 701. At all times when discussing a BSP entity or BSP server, it shall be understood that any actions or services described may be provided by an association or aggregation of business entities.

While the consumer waits for broadband installation, the BSP provides (at the consumer's option) dial-up service in the interim. The consumer should not be billed for broadband service (which often costs more than dial-up) until the broadband installation has occurred and the customer's computer(s) and/or Internet appliance(s) has been shown to function properly with the broadband service. The BSP and/or an affiliated installation organization contacts the consumer and schedules an appointment for broadband installation.

Broadband Installation and/or Sign-Off

During the installation, the technician installs appropriate hardware, software, and configures the consumer's system for access through the broadband connection. In case of DSL, the technician typically installs an Ethernet network card in the consumer's computer(s) and/or Internet appliance(s). The technician provides a DSL adapter and/or modem, or such other hardware needed to install the selected form of broadband. Additionally, some wiring may be needed in the customer's home (or business). Finally, the technician configures the Internet settings for the software (e.g., IP address, domain, DNS server addresses, and/or etc.).

Once the technician has finished any installation required to support broadband Internet access, the technician is ready for the consumer to perform a verification that the broadband installation is complete and functioning properly (Broadband Sign-off). In the illustrated embodiment, using the consumer's computer or other data appliance on which broadband access has been installed, the technician navigates to the URL for the Broadband Sign-off site. The fact that the Broadband Sign-off page can be displayed over the broadband connection, indicates that the broadband connection is working successfully. However, in another embodiment, an animation displayed on the broadband sign-off page demonstrates or verifies the fast download time (versus a traditional dial-up connection). The described page includes a sign-off area for the technician and for the customer. The technician fills in his or her name, company name, and potentially a certification number. Any form of unique identification would likely also work. The customer fills in his/her user information and password (or other information that would evidence their acknowledgment and/or authority). Optionally, other identification means such as a smart card, biometric reader, etc. is used to verify identity. When the customer and/or technician clicks "Submit," the consumer's account information is updated, and billing thereafter occurs at the broadband rate.

As shown in FIG. 9, the technician 905–908 and/or consumer 901–904 enters information in an electronic form that identifies them, indicates their approval 909 of the installation, and shows evidence of their authority 905–907.

Figure 10:
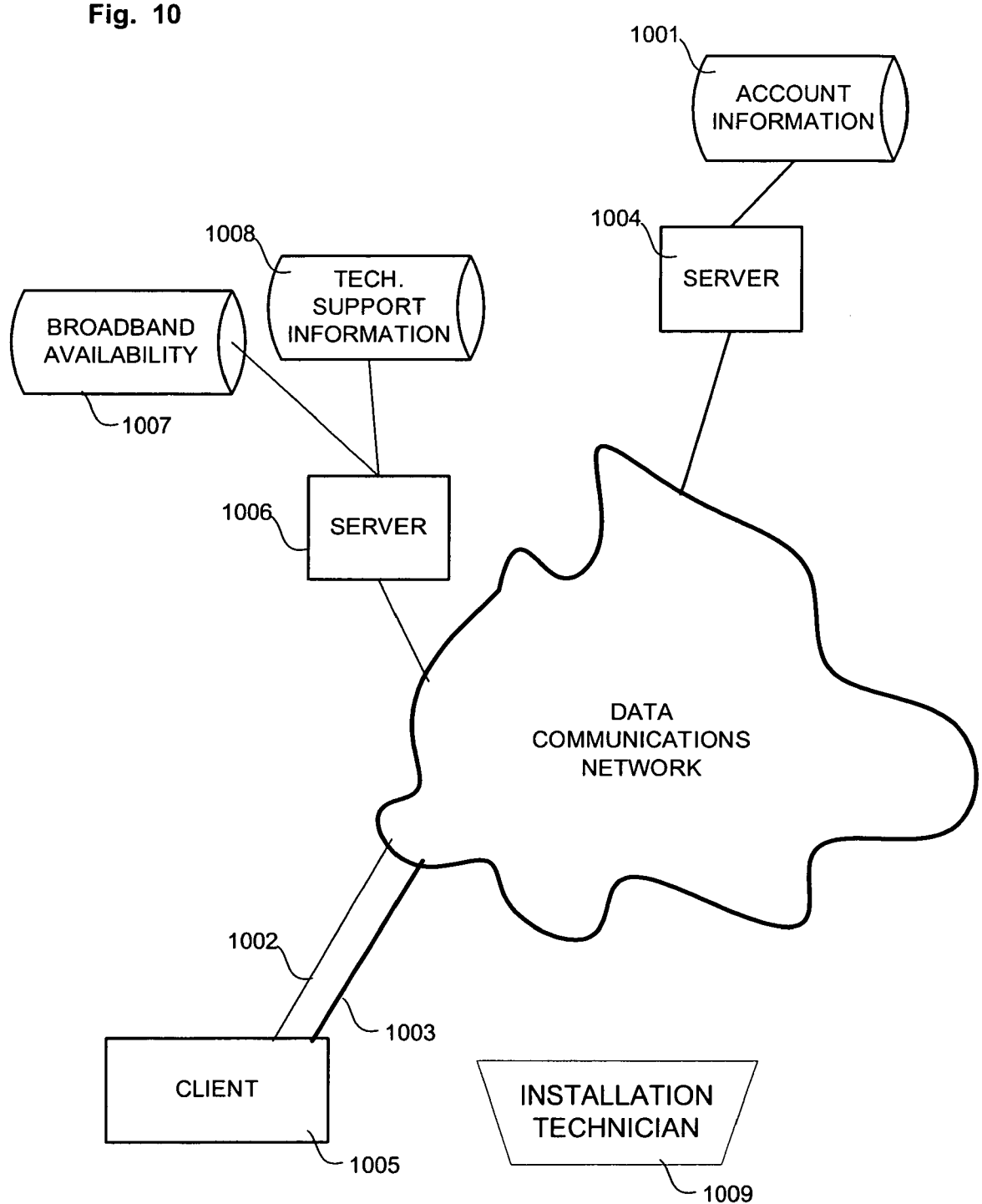
FIG. 10 is a network diagram depicting broadband sign-off.

As shown in FIG. 10, the entered data is sent to the BSP 1004, and logged in an account database 1001. The BSP modifies the customer's entry in the BSP's billing database to indicate that service has been started successfully and to commence billing.

The BSP server 1004 now has a clear date and time when the broadband service is functioning so the consumer is not billed at the broadband rate unless and until the customer verifies 901–904 that the broadband access is functioning properly 909. This functionality is particularly helpful in the illustrated embodiment, where a first business entity 1001, 1004 is maintaining the primary relationship with the consumer 1005, and does not want to begin billing the consumer at broadband rates until it is shown that the second business entity 1006–1008 has successfully installed broadband services. A BSP representative now has access to information contained in the BSP server 1004 and/or database 1001 indicating when the customer's service began functioning and the technician 905–908 who witnessed the broadband sign-off. The Broadband Sign-off page upon receipt by the server, signals the completed broadband connection at the consumer's computer and/or network appliance. In one embodiment, the BSP's database is now switched indicating that the consumer has switched from dial-up access 1002, to broadband access 1003.

In another embodiment, the BSP can return information to the customer's computer 1005 (and/or other data and/or communications appliance), to configure e-mail and set the home page for the browser (for example, to a broadband portal). The broadband connection 1003 has a higher bandwidth as indicated by the width of the line 1003, than the dial-up connection 1002. However, the broadband (of higher bandwidth) may actually be running over the same telephone lines at the consumer's location.

The illustrated embodiment provides an efficient way to commence a customer's broadband service, record their new account information, record their acceptance of broadband access, and begin billing at broadband rates upon broadband sign-off. If the consumer initially signed up for dial-up while they waited for broadband, the broadband sign-off switches the account from dial-up to broadband, and changes the billing rate.

When the technician (and/or consumer) pulls up the broadband sign-off page (FIG. 9), the user agrees that broadband has been installed (and in other embodiments, agrees on license terms) by entering their name 905–907 and clicking the "agree" button 909, which cancels the dial-up service (if interim dial-up service was provided), switches account information to indicate broadband access, and begins the broadband billing rate. Although, the illustrated embodiment is implemented using an active server page technology (ASP, which is known in the arts), other technologies are known to those skilled in the arts.

In another embodiment, the broadband sign-up forms (FIG. 6 and FIG. 8) and/or broadband sign-off form(s) (FIG. 9) generated by the BSP server and/or others, also set up other broadband related and/or Internet related services like e-mail, buddy lists, e-bank credit cards, and/or etc. (e.g., Microsoft Passport, Microsoft HOTmail).

Consumer Actions

Figure 3:
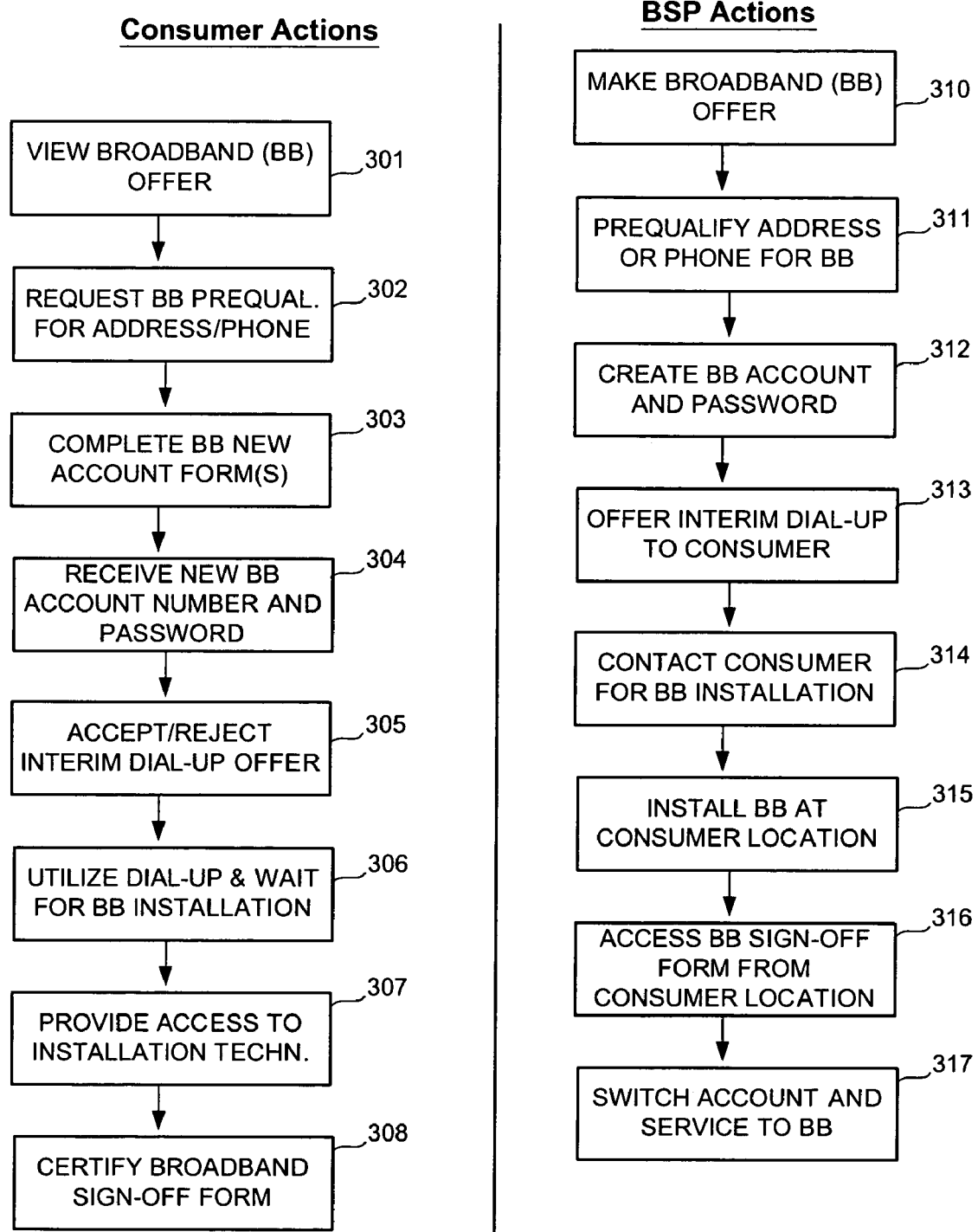
FIG. 3 is a flow chart indicating a broad overview of the actions taken by a consumer signing up for broadband, and the actions taken by a BSP in a creating a new consumer account.

As shown in FIG. 3, the consumer through marketing efforts made by a BSP, views a broadband access offer 301 (e.g., FIG. 1). The consumer then requests whether or not broadband access is available at a given address and/or phone number 302 (e.g., FIG. 6). The consumer then completes a form ordering broadband for the given address and/or phone number 303 (e.g., FIG. 8). The consumer receives and records the new broadband account number and/or password 304. The consumer accepts or rejects an offer to have dial-up network access while waiting the approximate 1–8 weeks for broadband access to be installed 305 (interim dial-up access service). If the consumer accepts the interim dial-up access service, the requisite dial-up software and/or instructions are up-loaded to the consumer's computer, mailed to the consumer's address on CD or diskette, or a telephone call to the consumer explains how to utilize the interim dial-up access. The consumer then utilizes the dial-up service while they are waiting for the broadband access to be installed 306. The consumer receives a call and/or other communication requesting a time when a technician may enter the installation location to complete the broadband installation 307. The consumer and/or others arrange for access to the installation site, so the technician can install the broadband access hardware, software, wiring, and/or configuration to enable broadband access 307. Upon completion of the broadband installation, the installation technician and/or consumer accesses the broadband sign-off page from the consumer's computer and/or other network appliance using the just installed broadband access, and the consumer and/or technician certifies that the broadband sign-off page 308 (e.g., FIG. 9). The consumer clicks the "Agree" button on the broadband sign-off page.

Broadband Service Provider (BSP) Actions

As shown in FIG. 3, the BSP offers broadband access to consumers through a number of marketing channels 310 (e.g., FIG. 1). The BSP then determines whether or not broadband access is available at a given address and/or phone number 311 (e.g., FIG. 6). The BSP then accepts a form ordering broadband access for the given address and/or phone number 312 (e.g., FIG. 8) and creates a new broadband access account 312. The BSP then returns the new broadband account number and/or password 312 to the consumer. The BSP offers an interim dial-up service to the consumer for the period of time (1–8 weeks) when the consumer is waiting for the broadband access to be installed 313 (interim dial-up access service). If the consumer accepts the interim dial-up access service, the requisite dial-up software and/or instructions are up-loaded to the consumer's computer, mailed to the consumer's address (on CD or diskette), or a telephone call to the consumer explains how to immediately access the interim dial-up access. The BSP then provides the dial-up access service to the consumer, while the consumer waits for the broadband access to be installed. The BSP then contacts the consumer to gain entrance to the installation location 314. A person arranged by the BSP (BSP technician) installs the broadband access hardware, software, wiring, and/or configuration to enable broadband access 315. Upon completion of the broadband installation, the BSP technician and/or consumer accesses the broadband sign-off page 316 from the consumer's computer and/or other network appliance over the just installed broadband access, and the consumer and/or BSP technician certifies the broadband sign-off page 317.

Ordering Broadband—Client and BSP Server Applications

Figure 4:
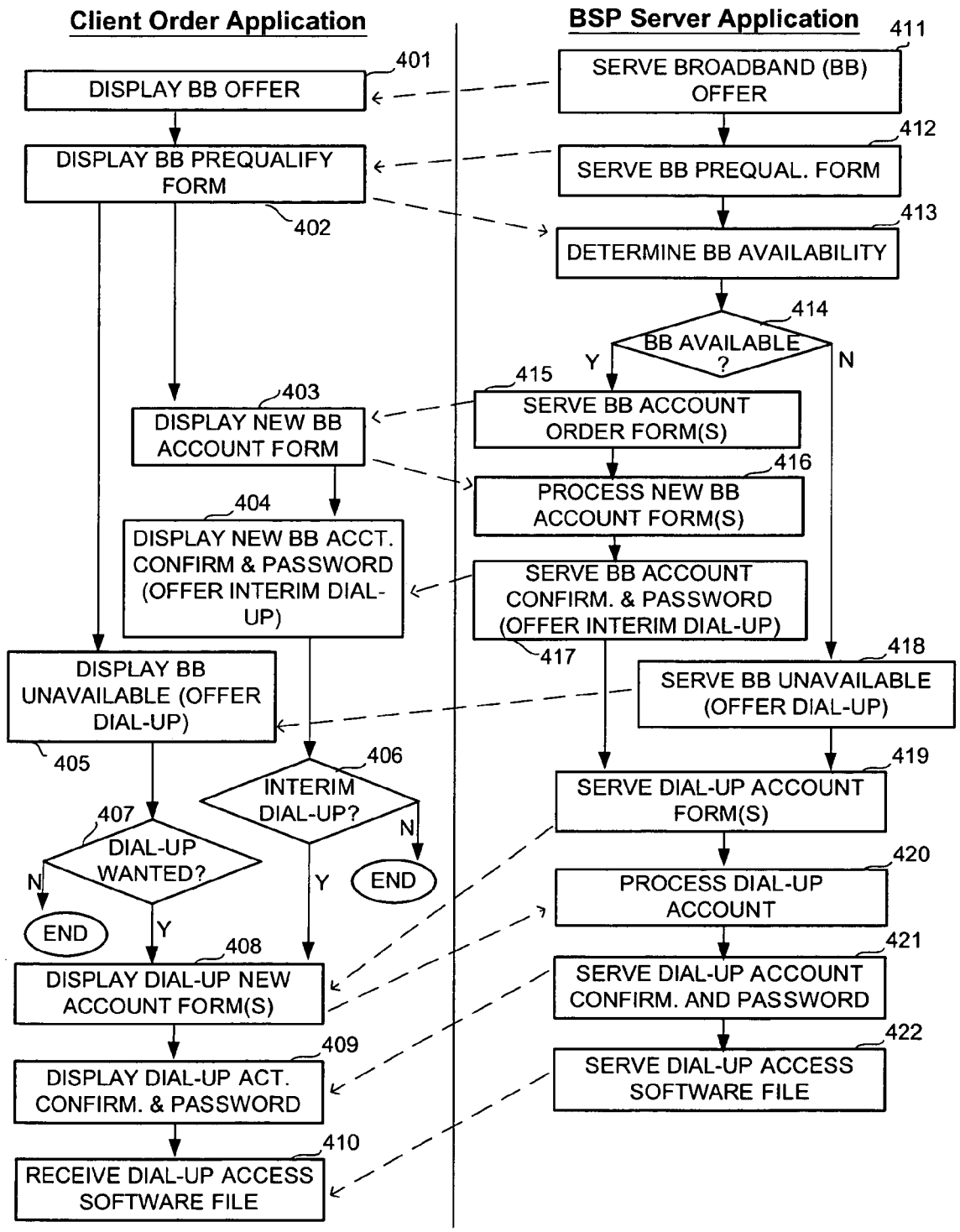
FIG. 4 is a flow chart depicting the information and data flow between BSP server software design and client software design for a new broadband service account request.

As shown in FIG. 4, the BSP server application 411, 707 serves a broadband service offer 401 to a client order application 702, 703, and/or 704 (e.g., FIG. 7 and FIG. 1). The client order application may be a network browser, and/or other application known in the arts to support networked communications. If the consumer viewing the offer clicks "OK" 100, a request is submitted by the client order application to the BSP server application, and the BSP server application serves a broadband pre-qualification form 412, 600, which is displayed at and completed by the consumer at a client order application 402.

If the consumer completes the pre-qualification form 601–605 and clicks "Submit" 606, the client order application posts the pre-qualification form fields inputs 601–605 to the BSP server application. The BSP server determines whether or not broadband access is available at the consumer's given address and/or phone number 603–605, 413–414. In the illustrated embodiment at FIG. 7, two BSP servers 707–708 are used to support the account qualification and set-up. In this embodiment, an account generation server 707 offers broadband services to consumers 702–704, and determines from another server 708–709, 701, whether broadband installation and support is available at a specific address (or area).

In another embodiment, one server (and/or BSP entity) could be offering broadband service sign-up to consumers, a second server (and/or BSP entity) could support determining broadband availability pre-qualification (and may contain broadband availability for many broadband service providers—even competitors), and a third server (and/or BSP entity) may support the broadband services for the requesting client upon installation. In another embodiment, one entity could offer, install, and support all these services using one or more servers and/or databases.

If it is determined that broadband access is available 414–415 at the given address and/or phone number, the BSP server 707 serves new broadband account sign-up form(s) to the client 415, 403 (e.g., FIG. 8).

If the consumer completes the new broadband access service sign-up form(s) 801–805 and clicks "Submit" 806, the client order application posts the new broadband access service form(s) inputs fields 801–805 to the BSP server application and/or database 416, 706–707, which processes and creates the new broadband access service account 417, and returns confirmation (including account number and/or password) to confirm the consumer's order 404, 702–704. Along with the confirmation, an offer is displayed to the consumer, to have interim dial-up service while they are waiting for broadband access installation 404.

If broadband service is not available at the given location and/or address 413–414, the BSP server application serves 418 a form to the client order application 405, offering dial-up service since broadband access is not available at the given address and/or phone number 418.

Whether a client order application user indicates a desire for dial-up access in the interim while waiting for broadband access installation 406, or indicates a desire for dial-up access service even though broadband access is not available at the given address and/or phone number 407, a request is sent by the client order application to the BSP server application, and the BSP server application serves dial-up account sign-up form(s) 419 to the client order application 408.

If the consumer completes the dial-up access service sign-up form(s) and clicks the submit button, the client order application posts the dial-up access service form(s) inputs fields to the BSP server application and/or database 420, 706–707, which processes and creates the dial-up service account 420–421, and returns confirmation (including account number and/or password) to the client order application 409, 702–704.

The BSP server application then creates and serves 422 the requisite dial-up software and/or instructions to a file on the computer where the client order application is running 410. This file can be saved to disk if the consumer is not ordering from the computer that will be running the dial-up access software.

In another embodiment, the dial-up access service software and/or instructions are mailed by a BSP representative to the consumer's on CD or diskette, and/or a BSP representative contacts the consumer by telephone to explain how to obtain dial-up access services on their present system.

In the illustrated embodiment, the BSP account generation server 707 sends a message to the BSP account installation and support server 708.

Client Broadband Sign-Off Application and BSP Server Broadband Sign-off Application As shown in FIG. 10 and FIG. 5, after broadband access has been installed on the consumer's computer (and/or network appliance) by the BSP technician 1009, the BSP technician, from the consumer's computer, navigates using a client network application running on the consumer's computer 501, 1005, to request a broadband sign-off form(s) 511. The client network application may be a network browser, and/or other application(s) known in the arts to support networked communications. The BSP server application 1004, serves a broadband sign-off form(s) 511, to the client network application 502, 1005 (e.g., FIG. 9).

The consumer and/or BSP technician completes the input fields on the displayed broadband sign-off form(s) 502, including an indication from the consumer that the broadband access installation is complete 905–909, and an indication from the BSP technician that the broadband access installation is complete 901–904. When the consumer and/or BSP technician have completed such indications 901–908 (or other indication of broadband access service operability at consumer's computer and/or network appliance), the consumer and/or BSP technician clicks the "Agree" button 909, which post the broadband sign-off input fields to the BSP server application 503, 1004.

The BSP server application 1004 receives the broadband sign-off form(s) input fields 512 and updates the consumer's account in the BSP account database 1001. If the consumer had interim dial-up service 513, then the account is switched from dial-up access service to broadband access service 514. If no interim service was being utilized, the broadband access service and billing is activated 515.

Finally, a broadband account sign-off confirmation is served by the BSP server application 516, 1004, and displayed by the client network application on the consumer's computer (and/or network appliance) 504.

The BSP server 1004 updates the clients account 1001 for billing and otherwise, to indicate that broadband access is completed.

In another embodiment, the Broadband Sign-off form is served and received by the BSP server 1006 controlled by the party providing broadband installation.

Exemplary Operating Environment

Figure 11:
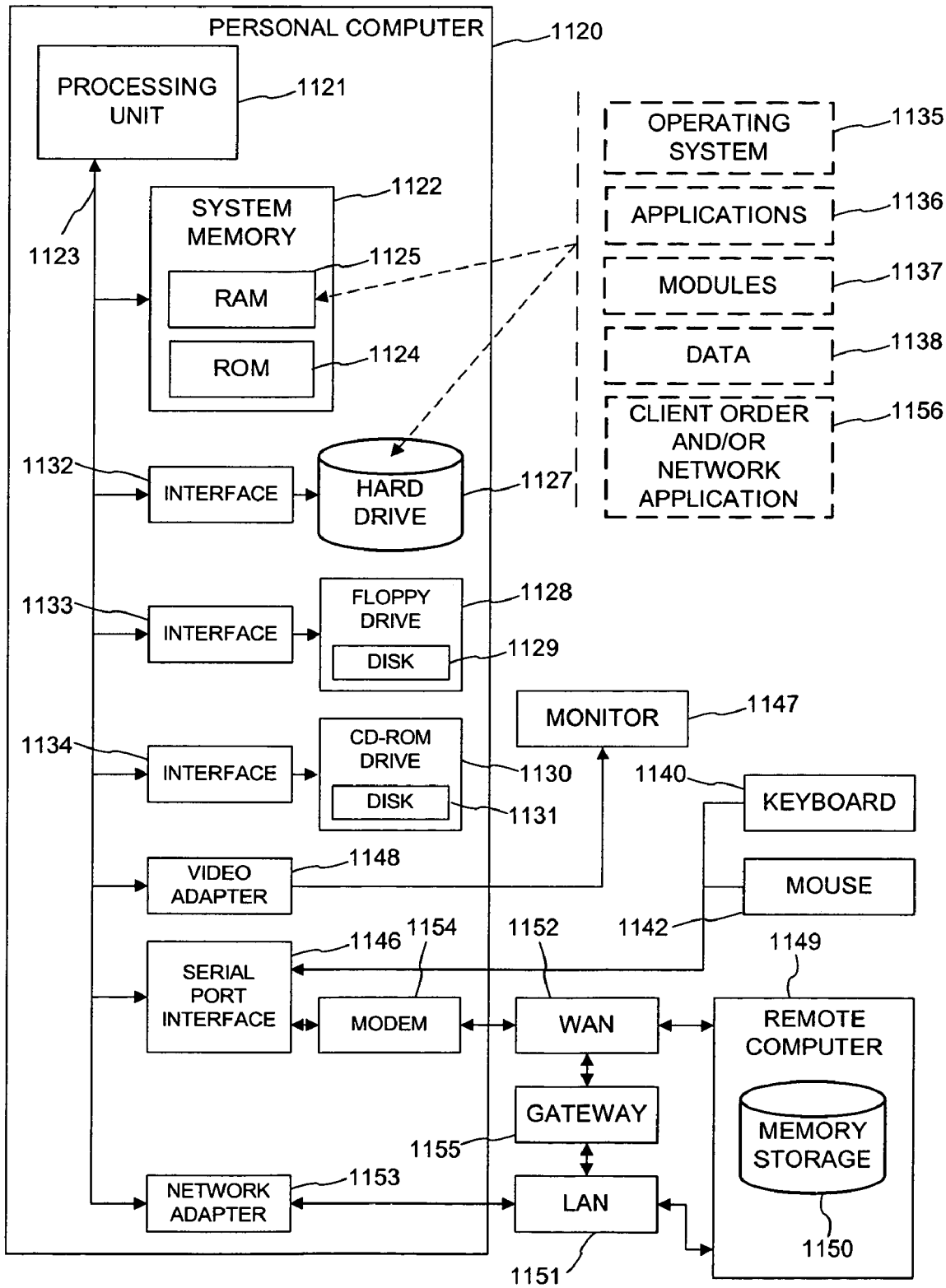
FIG. 11 is a block diagram of a distributed computer system implementing a method and apparatus embodying the invention.

FIG. 11 and the following discussion are intended to provide a brief, general description of a suitable computing environment in which the invention is implemented. While the invention will be described in the general context of computer-executable instructions of a computer program that runs on a computer and/or computer printer, those skilled in the art will recognize that the invention also may be implemented in combination with other program modules. Generally, program modules include routines, programs, components, data structures, etc. that perform particular tasks or implement particular abstract data types.

Moreover, those skilled in the arts will appreciate that the invention may be practiced with other computer system configurations, including hand-held devices, multiprocessor systems, microprocessor-based or programmable consumer electronics, minicomputers, mainframe computers, and the like. The illustrated embodiments of the invention also can be practiced in networked computing environments.

Further, the illustrated embodiment of the invention may be practiced on all the following either alone or in a network environment (wireless or not): portable computing devices, electronic organizers, electronic day planners, electronic devices with screens, devices connected to screens, devices connected to printers, cell phones with miniature browsers, textual pagers, hand-held inventory devices, vehicles containing onboard devices with displays, or devices of any kind that render text or character for display or printing. All these appliance could function in a network environment and would therefore be suitable for the invention.

With reference to FIG. 11, an exemplary system for implementing the invention includes a conventional computer 1120 (such as personal computers, laptops, palmtops or handheld-PCs, set-tops, network appliances, servers, mainframes, and other variety computers) includes a processing unit 1121, a system memory 1122, and a system bus 1123 that couples various system components including the system memory to the processing unit 1121. The processing unit is any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 1121.

The system bus is any of several types of bus structure including a memory bus or memory controller, a peripheral bus, and a local bus using any of a variety of conventional bus architectures such as PCI, VESA, AGP, Microchannel, ISA and EISA, to name a few. The system memory includes read only memory (ROM) 1124 and random access memory (RAM) 1125. A basic input/output system (BIOS), containing the basic routines that help to transfer information between elements within the computer 1120, such as during start-up, is stored in ROM 1124.

The computer 1120 further includes a hard disk drive 1127, a magnetic disk drive 1128, e.g., to read from or write to a removable disk 1129, and an optical disk drive 1130, e.g., for reading a CD-ROM disk 1131 or to read from or write to other optical media. The hard disk drive 1127, magnetic disk drive 1128, and optical disk drive 1130 are connected to the system bus 1123 by a hard disk drive interface 1132, a magnetic disk drive interface 1133, and an optical drive interface 1134, respectively. The drives and their associated computer-readable media provide nonvolatile storage of data, data structures, computer-executable instructions, etc. for the computer 1120. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules are stored in the drives and RAM 1125, including an operating system 1135, one or more application programs 1136, other program modules 1137, program data 1138, and comprising a client order application 1156, 201, 401–410, 702–704, a client network application 1156, 501–504, 1005, and/or other embodiments.

A user enters commands and information into the computer 1120 through a keyboard 1140 and pointing device, such as a mouse 1142. Other input devices (not shown) may include a microphone, joystick, game pad, satellite dish, scanner, or the like. These and other input devices are often connected to the processing unit 1121 through a serial port interface 1146 that is coupled to the system bus, but may be connected by other interfaces, such as a parallel port, game port or a universal serial bus (USB). A monitor 1147 or other type of display device is also connected to the system bus 1123 via an interface, such as a video adapter 1148. In addition to the monitor, computers typically include other peripheral output devices (not shown), such as speakers and printers.

The computer 1120 operates in a networked environment using logical connections to one or more remote computers, such as a remote computer 1149. The remote computer 1149 is a server, a router, a peer device or other common network node, and typically includes many or all of the elements described relative to the computer 1120, although only a memory storage device 1150 has been illustrated. The logical connections depicted include a local area network (LAN) 1151 and a wide area network (WAN) 1152. Such networking environments are commonplace in offices, enterprise-wide computer networks, intranets and the Internet.

When used in a LAN networking environment, the computer 1120 is connected to the local network 1151 through a network interface or adapter 1153. When used in a WAN networking environment, the computer 1120 typically includes a modem 1154 or other means for establishing communications (e.g., via the LAN 1151 and a gateway or proxy server 1155) over the wide area network 1152, such as the Internet. The modem 1154, which is internal or external, is connected to the system bus 1123 via the serial port interface 1146. In a networked environment, program modules depicted relative to the computer 1120, or portions thereof, are stored in the remote memory storage device. It will be appreciated that the network connections shown are exemplary and other means of establishing a communications link between the computers may be used.

The described environment, with many potential variations and/or adaptations known in the network computer arts, supports both dial-up and/or broadband network access.

In accordance with the practices of persons skilled in the art of computer programming, the present invention is described below with reference to acts and symbolic representations of operations that are performed by the computer 1120, unless indicated otherwise. Such acts and operations are sometimes referred to as being computer-executed. It will be appreciated that the acts and symbolically represented operations include the manipulation by the processing unit 1121 of electrical signals representing data bits which causes a resulting transformation or reduction of the electrical signal representation, and the maintenance of data bits at memory locations in the memory system (including the system memory 1122, hard drive 1127, floppy disks 1129, and CD-ROM 1131) to thereby reconfigure or otherwise alter the computer system's operation, as well as other processing of signals. The memory locations where data bits are maintained are physical locations that have particular electrical, magnetic, or optical properties corresponding to the data bits. In the illustrated computer system, an embodiment of a client system and software 1120, 1147, 1140, 1142, 1135–1156 is depicted, and an embodiment of a server system is depicted at 1149–1150.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus or software, unless indicated otherwise. Various types of general purpose or specialized computer apparatus may be used with or perform operations in accordance with the teachings described herein. Elements of the illustrated embodiment shown in software may be implemented in hardware and vice versa. Further, although illustrated as implemented in a personal computer, the invention can be practiced in other digital computing networked appliances.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of establishing a confirmed start date of broadband network service to a location upon completing installation of the broadband network service at the location for use by a billing system in billing for the broadband network service, the confirmed start date of service being based on receiving a broadband sign-off form, the method comprising, after completing installation of the broadband network service:
    transmitting a request by a client computer at the location over the installed broadband network service for the broadband sign-off form from a server computer;
    measuring a download time for the sign-off form from the server computer to the client computer;
    receiving by the client computer the broadband sign-off form from the server computer over the installed broadband network service, wherein the sign-off form comprises a representation of the download time and an input field;
    completing by a consumer and/or technician operating the client computer, the input field in the broadband sign-off form, the input field indicating that installation of the broadband network service is complete and functioning properly; and
    sending by the client computer to the server computer the broadband sign-off form containing the indication that the installation of the broadband network service is complete and functioning properly to thereby cause the billing system to record a start date of broadband network service based on the sent broadband sign-off form for initiating billing for the broadband network service, wherein the sending of the completed form provides confirmation of a start date from which the service is verified to have installation completed and be functioning properly.

2. The method of claim 1 further comprising:
    receiving at the client computer, network data communications via the broadband network service.

3. A method of establishing a confirmed start date of broadband network service to a location upon completing service installation of the broadband network service at the location for use by a billing system in billing for the broadband network service, the confirmed start date of service being based on receiving a broadband sign-off form, the method comprising, after completing installation of the broadband network service:
    receiving by a server computer from a client computer at the location, a request for the broadband sign-off form;
    sending by the server computer to the client computer over the broadband network service, the broadband sign-off form;
    measuring a download time for the sign-off form from the server computer to the client computer, wherein the sign-off form comprises a representation of the download time and an input field; and
    receiving by the server computer from the client computer, an indication that the installation of the broadband network service is complete and functioning properly to thereby cause the billing system to record a start date of broadband network service based on the sent broadband sign-off form and initiate billing for the broadband network service, wherein the receiving of the completed form provides confirmation of a start date from which the service is verified to have installation completed and be functioning properly.

4. The method of claim 3 further comprising:
    in response to the indication, switching network service communications directed to the location from dial-up service to broadband service.

5. The method of claim 3 further comprising:
    updating at the direction of the server computer, a billing database to record the start date of broadband network service.

6. A method of establishing a confirmed start date of broadband network service to a location upon completing service installation of the broadband network service at the location for use by a billing system in billing for the broadband network service, the confirmed start date of service being based on receiving a remotely-stored form, the method comprising, after completing installation of the broadband network service:
    requesting from the location over the broadband network service, the remotely-stored form;
    measuring a download time for the form to the location;
    receiving the remotely-stored form at the location, wherein the form comprises a representation of the download time and an input field;
    completing at the location, the remotely-stored form, such form comprising an indication that the broadband network service has been installed at the location and is functioning properly; and
    sending the completed form and/or indication from the location over the broadband network service to thereby cause the billing system to record a start date of broadband network service based on the sent form and/or indication and initiate billing for the broadband network service, wherein the sending of the completed form provides confirmation of a start date from which the service is verified to have installation completed and be functioning properly.

7. The method of claim 6 further comprising:
    receiving at the location, network data communications via the broadband network service.

8. A computer system for use by a billing system in billing for a broadband network service after completing installation of the broadband network service, comprising:
    a client computer comprising networking client software operating to display a form;
    a data communications network; and a server computer comprising broadband sign-off server software operating to provide an electronic form to the client computer, the server measuring a download time for the form from the server computer to the client computer, wherein the form comprises a representation of the download time, the server subsequently receiving data from the client computer indicating that the client computer has broadband access to the data communications network and that the broadband access is functioning properly, the data providing a confirmation of a start date from which the service is verified to have installation completed and be functioning properly, such data causing the billing system to record the start date of broadband network services and initiate billing for the broadband network service.

9. The computer system of claim 8, further comprising:
the server computer comprising an accounting system, the accounting system maintaining an account, and the account is updated to indicate a broadband access effective date for a billing cycle subsequent to the date the client computer had broadband access to the data communications network.

10. A system for use by a billing system in billing for a broadband network service after completing installation of the broadband network service, comprising:
a broadband service provider facility;
a data communications network; and
a server computer comprising broadband sign-off server software operating to provide an electronic form to a client computer, the server measuring a download time for the form from the server computer to the client computer, wherein the form comprises a representation of the download time, and the server subsequently receives data from the client computer indicating that the client computer has broadband access to the data communications network and that the broadband access is functioning properly, the data providing a confirmation of a start date from which the service is verified to have installation completed and to be functioning properly, such data causing the billing system to record the start date of broadband network services and initiate billing for the broadband network service.

11. The system of claim 10, further comprising:
the server computer comprising an accounting system, the accounting system maintaining an account, and the account is updated to indicate a broadband access effective date for a billing cycle subsequent to the date the client computer had broadband access to the data communications network.

12. A computer readable medium having code comprising:
code for, providing a form over a data communications network to communicate a confirmation for use by a billing system in billing for a broadband network service after completing installation of the broadband network service;
code for, measuring a download time for the form from a server computer to a client computer, wherein the form comprises a representation of the download time; and
code for, receiving an indication that the form has been completed by a client;
whereby the completed form indicates that a broadband access has been established with the client over the data communications network and that the broadband access is functioning properly, the completed form providing confirmation of a start date from which the service is verified to have installation completed and be functioning property, thereby causing the billing system to record the start date of broadband network service based on the sent form and initiate billing for the broadband network service.

13. The computer readable medium of claim 12 further comprising:
code for, updating a client account information database to record the date that broadband access is established with the client over the data communications network.

14. The computer readable medium of claim 12 further comprising:
code for, switching the data network communications directed to the client from a dial-up service to a broadband service.

15. A method of establishing a confirmed start date of broadband network service to a location for use by a billing system in billing for the broadband network service, the method comprising, after completing installation of the broadband network service:
measuring a download time for a sign-off form from a server computer to a client computer, wherein the sign-off form comprises a representation of the download time;
receiving, over a broadband network, an indication from the client computer that the broadband network service is installed and working properly and that billing for the broadband network service may begin, the indication providing a confirmation of a start date from which the service is verified to have installation completed and be functioning properly;
updating an account in an accounting system, updating comprising determining, based on the indication, the start date for a billing cycle subsequent to the date the client computer had broadband access to the data communications network.

16. A method of establishing a broadband network service connection for a client computer at a location and verifying that the connection is functioning properly, the method comprising:
installing broadband network hardware for the client computer at the location, wherein the client computer is not connected to the network, and wherein the installation is monitored locally;
establishing a connection between the client computer and the broadband network through the hardware;
transmitting a request by the client computer over the broadband network service connection for a broadband sign-off form from a remote server computer;
measuring a download time for the sign-off form from the server computer to the client computer;
receiving by the client computer the broadband sign-off form from the server computer over the installed broadband network service, wherein the sign-off form comprises a representation of the download time;
completing by a consumer and/or technician operating the client computer, an input field in the broadband sign-off form, the input field indicating that installation of the broadband network service is complete; and
sending by the client computer to the server computer the broadband sign-off form containing the indication that the installation of the broadband network service is complete.

17. A method of verifying operation of a new broadband network service connection at a location, the method comprising:

transmitting a request by a client computer at the location over the installed broadband network service for a broadband sign-off form from a server computer;

measuring a download time for the sign-off form from the server computer to the client computer;

receiving by the client computer the broadband sign-off form from the server computer over the installed broadband network service, wherein the sign-off form comprises a representation of the download time and an input field;

completing by a consumer and/or technician operating the client computer, the input field in the broadband sign-off form, the input field indicating that installation of the broadband network service is complete; and sending by the client computer to the server computer the broadband sign-off form containing the indication that the installation of the broadband network service is complete.

18. A method of updating billing records for a network connection customer, the billing records reflecting that the customer is currently being billed for a first type of network connection, the method comprising:

measuring a download time for a broadband sign-off form from a server to a client computer associated with the customer;

receiving by the server, from the client computer associated with the customer, an indicator that a second type of network connection is newly operational, wherein the indicator comprises the broadband sign-off form sent from the server to the client computer over the second type of network connection and then sent from the client computer to the server over the second type of network connection, wherein the sign-off form comprises a representation of the download time and an input field, the input field indicating that installation of the second type of network connection is complete; and modifying the billing records to stop billing the customer for the first type of network connection and begin billing the customer for the second type of connection.

19. The method of claim 18, wherein the first type of network is a dial-up connection and the second type of network is a broadband connection.

* * * * *